(12) United States Patent
Moore (10) Patent No.: US 6,377,210 B1
(45) Date of Patent: Apr. 23, 2002

(54) AUTOMATIC MOBILE OBJECT LOCATOR APPARATUS AND METHOD

(75) Inventor: I. Andrew Moore, Toronto (CA)

(73) Assignee: Grey Island Systems, Inc., Toronto (CA)

( * ) Notice: Subject to any disclaimer, the term of this patent is extended or adjusted under 35 U.S.C. 154(b) by 0 days.

(21) Appl. No.: 09/513,600

(22) Filed: Feb. 25, 2000

(51) Int. Cl.[7] .............................. G01S 5/02; H04B 7/185
(52) U.S. Cl. ............................ 342/357.13; 342/357.1; 342/357.09; 701/208
(58) Field of Search ..................... 342/357.13, 357.09, 342/357.1; 701/208, 212

(56) References Cited

U.S. PATENT DOCUMENTS

| | | |
|---|---|---|
| 5,225,842 A | 7/1993 | Brown et al. |
| 5,712,899 A | 1/1998 | Pace, II |
| 5,758,313 A * | 5/1998 | Shah et al. .................. 701/208 |
| 5,796,728 A | 8/1998 | Rondeau et al. |
| 5,808,565 A * | 9/1998 | Matta et al. ................. 340/994 |
| 5,938,721 A | 8/1999 | Dussell et al. |
| 5,959,577 A | 9/1999 | Fan et al. |
| 6,028,537 A * | 2/2000 | Suman et al. ............... 340/988 |
| 6,163,749 A * | 12/2000 | McDonough et al. ....... 701/208 |

* cited by examiner

Primary Examiner—Theodore M. Blum
(74) Attorney, Agent, or Firm—Young & Basile, PC (57) ABSTRACT

An automatic mobile object locator apparatus and method provides position information and map data to user terminal equipment through a data communication network, such as the Internet. A GPS receiver in mobile equipment attached to a vehicle obtains global position information of the vehicle which is transmitted through a communication network, including at least a wireless network portion, to a processor unit. The vehicle position information for like vehicles associated with one customer are stored in a customer specific database. Map data and position information are transmitted through the data network between the processor unit and user terminal equipment wherein a selected map and the location of a selected vehicle(s) are coupled and displayed to the user.

18 Claims, 11 Drawing Sheets

AUTOMATIC MOBILE OBJECT LOCATOR APPARATUS AND METHOD

BACKGROUND OF THE INVENTION

1. Field of the Invention

The present invention relates, in general, to object locating systems and, more specifically, to systems for locating vehicles and other mobile objects from a central location utilizing global positioning signals.

2. Description of the Art

Global positioning systems (GPS) are used to obtain position information of an object anywhere in the world. A GPS receiver receives data signals from multiple GPS or GLONASS satellites and triangulates the data signals to obtain the measured position or location of the receiver. Such GPS receivers generate output signals, typically containing the longitude and latitude of the particular GPS receiver antenna.

GPS receivers have been employed in vehicle navigation or locating systems. Typically, a conventional GPS receiver is mounted as a mobile unit in a vehicle. Each mobile unit also includes a wireless transmitter which is capable of transmitting the GPS data from a particular mobile unit GPS receiver to a base station via wireless and/or land line communication networks.

The base station will include signal receiving equipment to receive and decode the particular mobile unit ID as well as the reported longitude and latitude of the mobile unit at specific time intervals, such as every few seconds, every minute, etc.

The base station also contains a map database in which maps of a particular geographic region are digitally stored. Landmarks, buildings and other points of interest within the particular geographic region may be also coded with specific latitude and longitude.

It is also known to connect the base station via a communications network, such as the Internet, with a plurality of monitoring units, such as a police dispatcher, ambulance dispatcher, delivery truck dispatcher, etc., to enable the operators of the monitoring units to request location information of the vehicles under their control, such as police cars, ambulances, fire trucks, delivery trucks, busses, etc. The base station, in response to a vehicle location request or on a periodic basis, will transmit a map which contains embedded vehicle location markers to the requesting monitoring unit. The periodic transmission of such data enables the operators to maintain a constant visual awareness, through the monitoring units, of the location of all of the vehicles under their control.

However, considerable data storage is required to store each map having embedded vehicle location markers for transmission to a plurality of monitoring units. This results in relatively large, complex and expensive vehicle locating systems which require a significant investment in terms of time, money and people in order to implement and operate.

Further, the large amount of data required to transmit both map and vehicle location information results in infrequent transmission of the data and, thus, a relatively static vehicle location display. Although the location and movement of a vehicle containing a mobile receiver and transmitter can be monitored by previously devised GPS based vehicle locating systems, only vehicle location is typically available from such systems. Other information which could be of great importance to the central monitoring operator could include the current velocity of the vehicle, a historic record of the path of movement of the vehicle, the velocity of the vehicle throughout such path of movement, etc.

Thus, it would be desirable to provide a vehicle locating system which addresses the deficiencies found in previously devised GPS based vehicle locating systems. It would also be desirable to provide a GPS based vehicle locating system which provides multiple bits of information concerning each monitored vehicle at a low cost in terms of use, system equipment, installation, etc. It would also be desirable to provide a GPS based vehicle locating system which has the ability to separately monitor multiple groups of vehicles from different monitoring stations. It would also be desirable to provide a GPS based vehicle locating system which can make use of readily available GPS receiver and transmitter equipment, monitoring terminal equipment, GPS system improvements, and different wireless and land line networks without significant modification to the vehicle locating system.

SUMMARY OF THE INVENTION

The present invention is an automatic mobile object locator apparatus and method capable of locating the geographic position of mobile objects and displaying the geographic position of such objects on a display at a user terminal.

In one aspect of the invention, the mobile object locator apparatus includes a datacenter, a mobile object including a receiver for receiving global positioning system signals from a global positioning system and calculating the position of the mobile object, a transmitter in communication with the mobile object for transmitting the position information of the mobile object to a network, including a wireless communication portion, for receiving the position information from the transmitter and for transmitting the position information to the datacenter. The datacenter stores the position information in a user specific mobile object location database for all mobile objects of one user. Map data for at least one geographic region is stored in a map database. A data network couples the datacenter and user terminal equipment in data communication to enable access to the mobile object location database and the map database by the user terminal equipment to selectively obtain the position information from the mobile object location database and the map data from the map database. The position information and map data are transmitted separately through the data network in response to a user request.

Preferably, the data network is the Internet.

In another aspect of the invention, the position information from the mobile object is stored by the datacenter in the mobile object location database at successive time intervals. The datacenter is capable of accessing the stored position information and calculating and transmitting a data description of a historic path of movement of the mobile object over a predetermined time interval, optionally along with the speed of movement of the mobile object at selected locations along such path of movement.

In another aspect of the invention, a method of automatically locating a mobile object comprises the steps of:

mounting a receiver on a mobile object for receiving global positioning system signals from a global positioning system;

calculating the position of the mobile object from the global positioning system signals;

providing a wireless transmitter in data communication with the receiver for transmitting the position information of the mobile object;

communicating the position information to a datacenter;

storing the position information in a user specific mobile object location database;

storing map data of at least one geographic area in a map database;

providing data communication between the datacenter and at least one remote user terminal;

providing the user terminal with a selection of one of the map data and the position information and transmitting the user terminal selection to the datacenter; and transmitting the selected one of the map data and the position information from the datacenter to the user terminal.

The mobile object locator apparatus and method of the present invention provide significant advantages and improvements over previously devised vehicle locating systems. By storing position information from each vehicle containing a mobile object in a specific customer database for all like vehicles associated with a particular customer, the mobile object locator apparatus of the present invention is capable of monitoring different groups of vehicles and maintaining the position information for such vehicles separate from position information for other customer's vehicles.

The mobile object locator apparatus and method of the present invention, by transmitting map data and mobile object position information separately from the central station to the user terminal equipment, provides more efficient data communication with the user terminal equipment since updated mobile object position information or different maps may be transmitted independent of each other through the data communication network to the user terminal equipment.

The storage of the mobile object position information at time intervals in a database also enables the present apparatus and method to provide a history of a particular vehicle's path of movement and speed.

BRIEF DESCRIPTION OF THE DRAWINGS

The various features, advantages and other uses of the present invention will become more apparent by referring to the following detailed description of the drawing in which.

DESCRIPTION OF THE PREFERRED EMBODIMENTS

Figure 1:
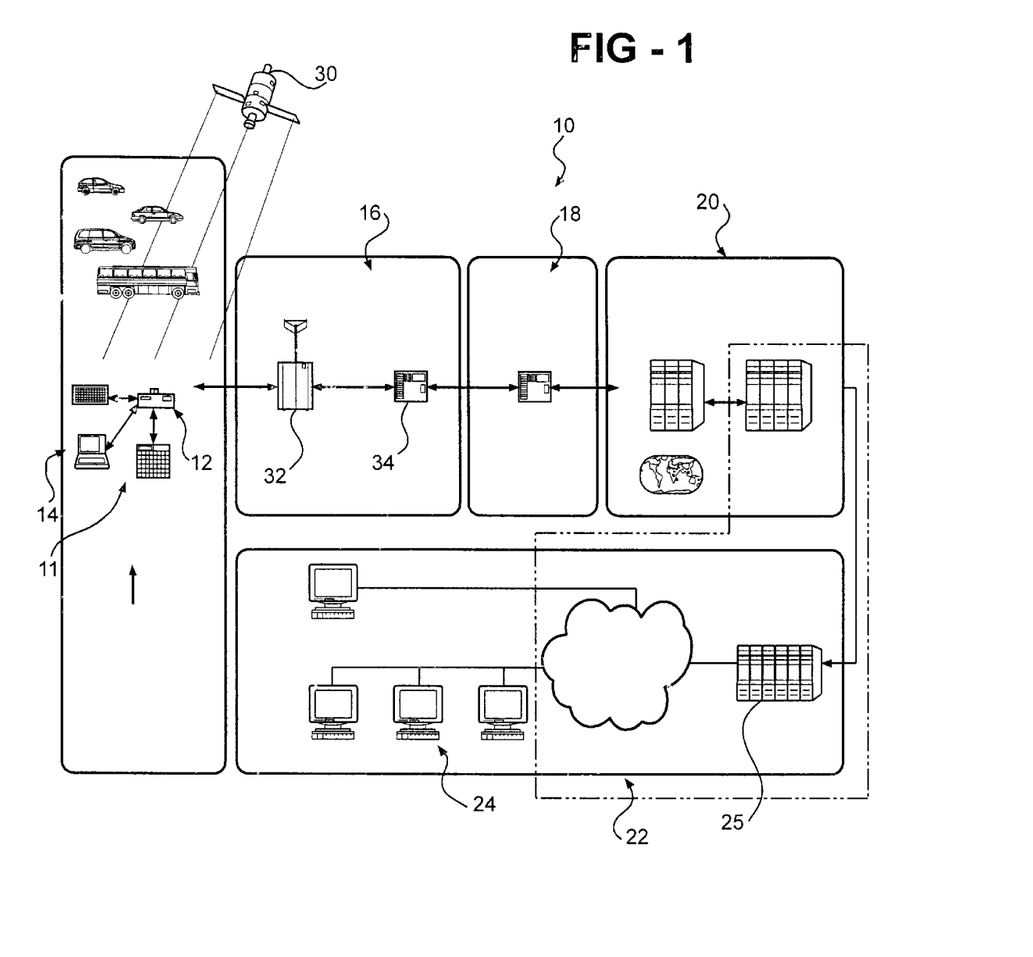
FIG. 1 is a block diagram of an automatic mobile object locator apparatus according to the present invention.
Figure 2:
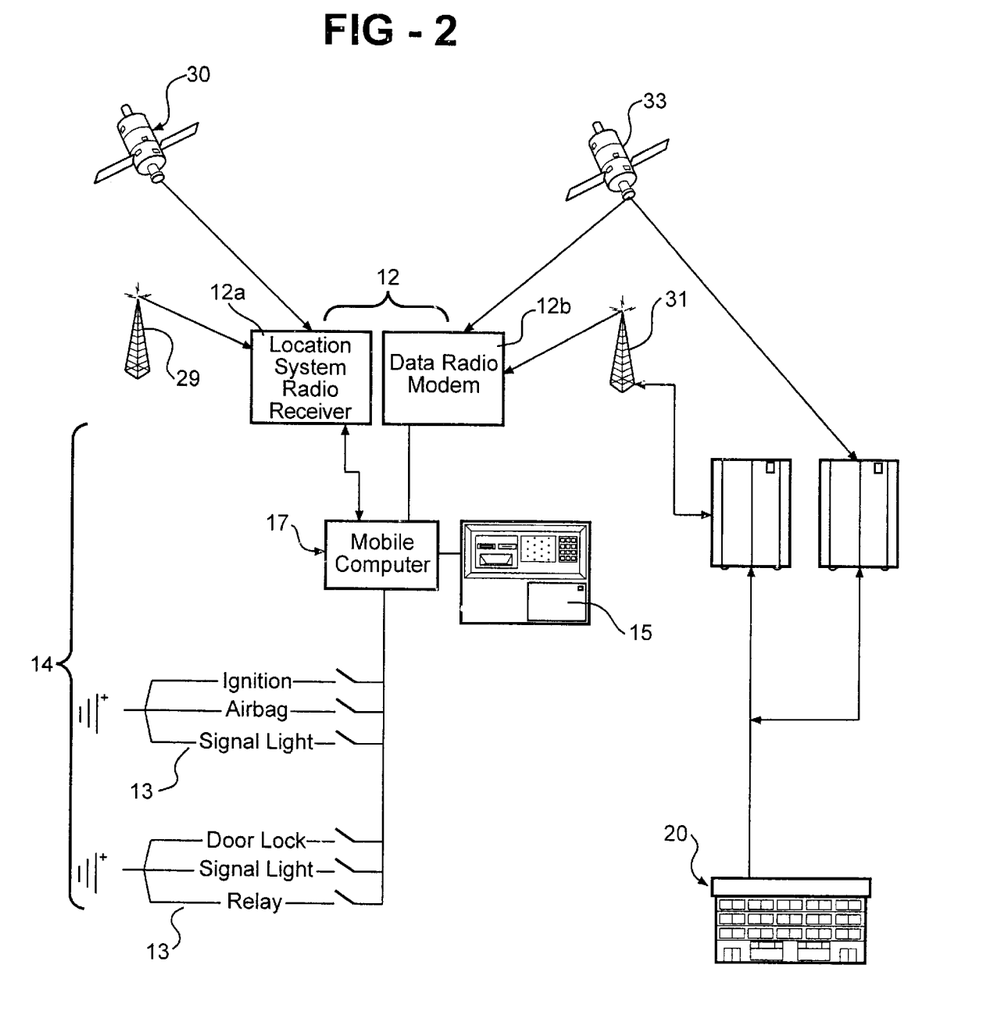
FIG. 2 is a pictorial representation of the mobile equipment data communication arrangement according to the present invention.

Referring now to the drawing, and to FIGS. 1 and 2 in particular, there is depicted an automatic mobile object locator apparatus 10 constructed in accordance with the teachings of the present invention.

The apparatus 10 includes a number of different components which include mobile or onboard equipment 11 in the form of an integrated GPS receiver and transmitter 12, and optional mobile data terminal equipment 14, a wireless data network 16, a land communication network 18, a datacenter 20, a data communication network 22 and user terminal equipment 24.

The mobile equipment 11 is based around a global positioning system receiver 12 which is capable of receiving global positioning system (GPS) signals from multiple GPS satellites 30 forming part of the United States Global Positioning System. The satellites 30 could also be satellites from the Russian Global Navigation Satellite System (GLONASS). The conventional GPS receiver 12, which can be any commercially available GPS receiver, such as GPS receivers sold by Trimble, Rockwell, Garmin and Motorola, calculates the mobile object or vehicle position once per second based on a triangulation of signals received from three or more GPS satellites 30. The data transmitted by the GPS receiver 12 is automatically transmitted on a periodic basis, such as once every 3 seconds to once every few minutes, based on the particular application, the mobility of the vehicles, the customer's preference, etc.

A software control program installed in the mobile equipment 11 enables the GPS receiver and transmitter 12 and/or the optional mobile data terminal equipment 14, such as mobile data terminal equipment sold by RIM, WinCE and Palm, for example, to support communications with the datacenter 20 and the Internet browser software, described hereafter, and allows the datacenter 20 to communicate with the operators or drivers of the vehicles. This program also allows the drivers to see maps displayed on the mobile data terminal equipment 14 with their own location marked, the location(s) of other vehicles in the fleet marked and addresses displayed for locations to which the driver is to proceed.

The transmitter 12 may be any wireless transmitter device which is capable of transmitting the position information, typically in the form of longitude and latitude, to the wireless data network 16. Modems such as those sold by Novatel, Sierra, Uniden and RAM may be used for the mobile transmitter 12.

In a preferred embodiment, the GPS receiver and data transmitter 12 is preferably formed of an integrated GPS receiver and CDPD transmitter, such as the unit sold by Ancor Engineering, model number GPS10-8/CDPD, for example. This device has an 8 channel GPS receiver which is differential capable and supports a GPS antenna. Eight optically-isolated digital inputs and five relay-driven outputs are provided on the integrated GPS receiver and data transmitter for receiving input signals from various devices within the vehicle, such as the opening of a door, movement of the vehicle, etc., as well as to display inputs to the driver, or even take action, such as locking the doors, sounding the horn, etc.

It will be understood, however, that the GPS receiver and data transmitter 12 may be separate units coupled in data communication, with the GPS receiver functioning only to receive GPS position information and the data transmitter functioning only to transmit the position information to the wireless data network 16.

A GPS antenna and a cellular antenna are mounted on the integrated GPS receiver and data transmitter 12 to receive and transmit the GPS position information provided by the GPS receiver 12 to the wireless data network 16.

FIG. 2 also depicts other location systems, such as a land based system utilizing geographically spaced transmitters 29 which transmit position information to the GPS receiver 12 on the mobile object. The position of the mobile object or vehicle can be determined by triangulation from a number of land based towers 29 in the same manner as described above for GPS signals from the GPS satellites 30.

Figure 3:
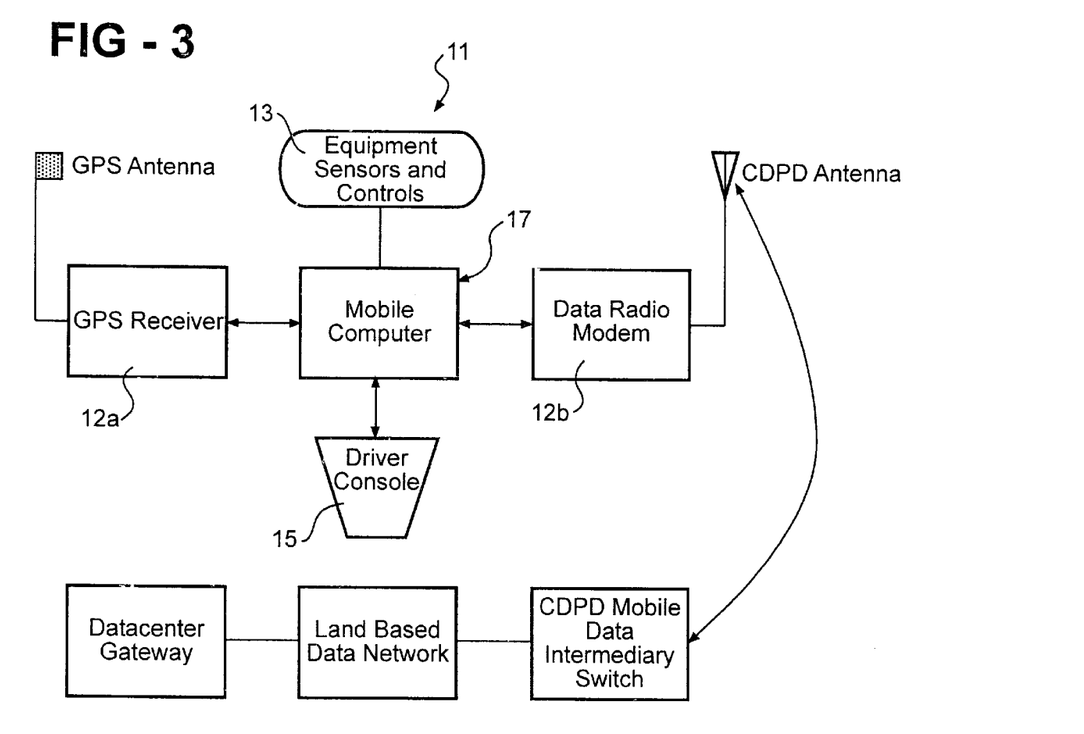
FIG. 3 is a block diagram showing the construction and data flow of the mobile equipment.

A more detailed depiction of the components of the mobile equipment 11 is shown in FIG. 3. In this embodiment, the GPS receiver 12A is depicted as being separate from the data radio modem 12B. However, as described above, the GPS receiver 12A and the data radio modem 12B can be separate elements as shown or integrated into a combined GPS receiver and data transmitter. The mobile computer 17 which forms the focal point of the mobile equipment 11 communicates with the GPS receiver 12A, the data radio modem 12B, the equipment sensors and controls 13, as described above and shown in FIG. 2, as well as with a driver console 15 which can include a display, input keypad, card reader, scanner, etc.

In general operation, the GPS receiver 12A receives GPS navigation messages from several satellites 30. The receiver 12A calculates the current location, speed, bearing and other information and transmits the data to the mobile computer 17 each second. The mobile computer 17 sends a location message along with input sensor data from the equipment sensors and controls 13 and driver console messages from the driver console 15 to the data radio modem 12B. These messages are timed stamped with the GPS time and sent to the datacenter 20 on a preprogrammed reporting frequency. The frequency can be based on the time since the last report, the distance traveled since the last report, a request from the datacenter 20, a change in the status of a sensor 13 or input from the driver console 15.

If there is no wireless data network service, the messages from the mobile computer 17 are stored in memory until the vehicle is in the range of a wireless tower 31. At this time, all of the stored messages are transmitted to the datacenter 20. All messages are identified with a unique identifier of the data radio modem 12B.

The mobile equipment 11 is also capable of receiving messages from the datacenter 20 via the wireless data network 16. These messages are sent to the radio data modem 12B based on the unique identifier of the modem. These messages can, for example, request an immediate location message, change the status of an output sensor, change the reporting frequency, update the driver console 15, etc.

The mobile computer 17 can be any programmable general purpose mobile computer with a real-time operating system, such as WinCE, except where certain functions are provided in an integrated GPS/CDPD modem from the hardware manufacturer.

Figure 4:
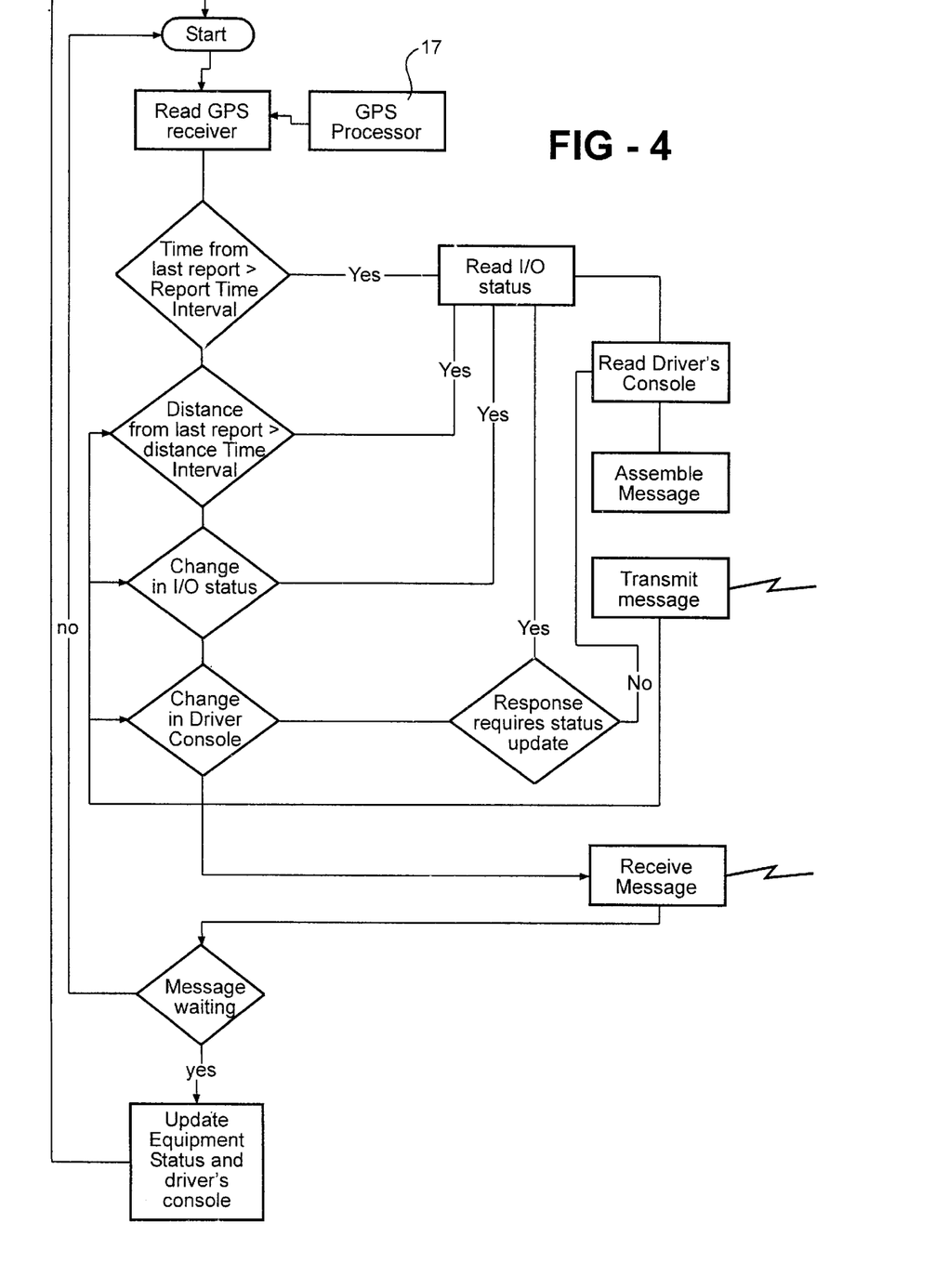
FIG. 4 is a block diagram of the sequence of operation of the mobile equipment.

FIG. 4 depicts the information flow of the mobile equipment 11. The mobile computer or CPU 17 cycles through the sequence shown in FIG. 4 approximately once per second. In general, the CPU or processor unit 17 reads the GPS signal each time the signal is received. The processor unit 17 then checks for reporting conditions, such as if the time from the last report has expired, if the distance from the last report is greater than the distance time interval, if there has been a change in the I/O status, or if there has been change in the driver console outputs. If any of these conditions are met, the processor unit 17 reads the I/O status, reads the driver console 15, assembles the appropriate message and then transmits the message through the radio data modem 12B to the datacenter 20.

The processor unit 17 is also capable of receiving messages from the datacenter 20. An incoming message sets a flag which the processor unit 17 acknowledges and takes action according to the content of the message, such as updating equipment status and the driver console 15.

Although the following description illustrates the use of a vehicle as the mobile object, it will be understood that the mobile or onboard equipment 11 can be placed on any mobile object, such as people, etc.

Referring back to FIGS. 1 and 2, the wireless data network 16 may take many forms thereby enhancing the easy implementation, updating and operation of the automatic mobile object locator apparatus 10. One example of a wireless data network is a CDPD network provided by Ameritech. The location data or position information from a vehicle is transmitted by the transmitter 12 to a wireless database station 32 having base towers 31 in the case of land based wireless systems, or to a satellite 33 in systems such as M-Sat or Orbcom. Other wireless networks available for use in the present invention include networks sold under the trade names Mobitex, Ardis Cellular, GMS, 3G and Ricochet.

The base station 32 re-transmits the vehicle location or position data to a mobile data intermediary system 34 for addressing and routing to one of the telephone companies wide area land networks 18.

FIG. 2 shows both a land based location system 31 and a satellite data network 33. This illustrates the flexibility of the present invention in that the locator apparatus 10 can use different data transmission networks and location technologies, but with the end result being the same map display of the positions of the mobile objects. A single mobile object or vehicle can have both wireless data transmission capabilities and satellite modems for operating efficiently in different geographical areas.

Figure 5:
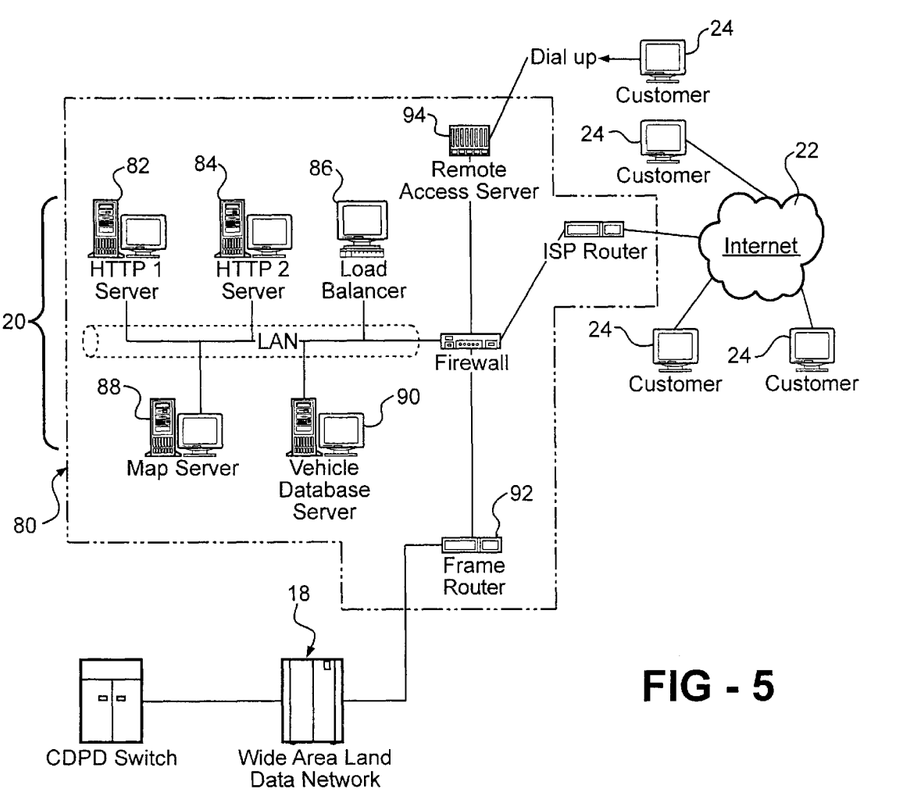
FIG. 5 is a block diagram of the major components of the datacenter according to the present invention.
Figure 6:
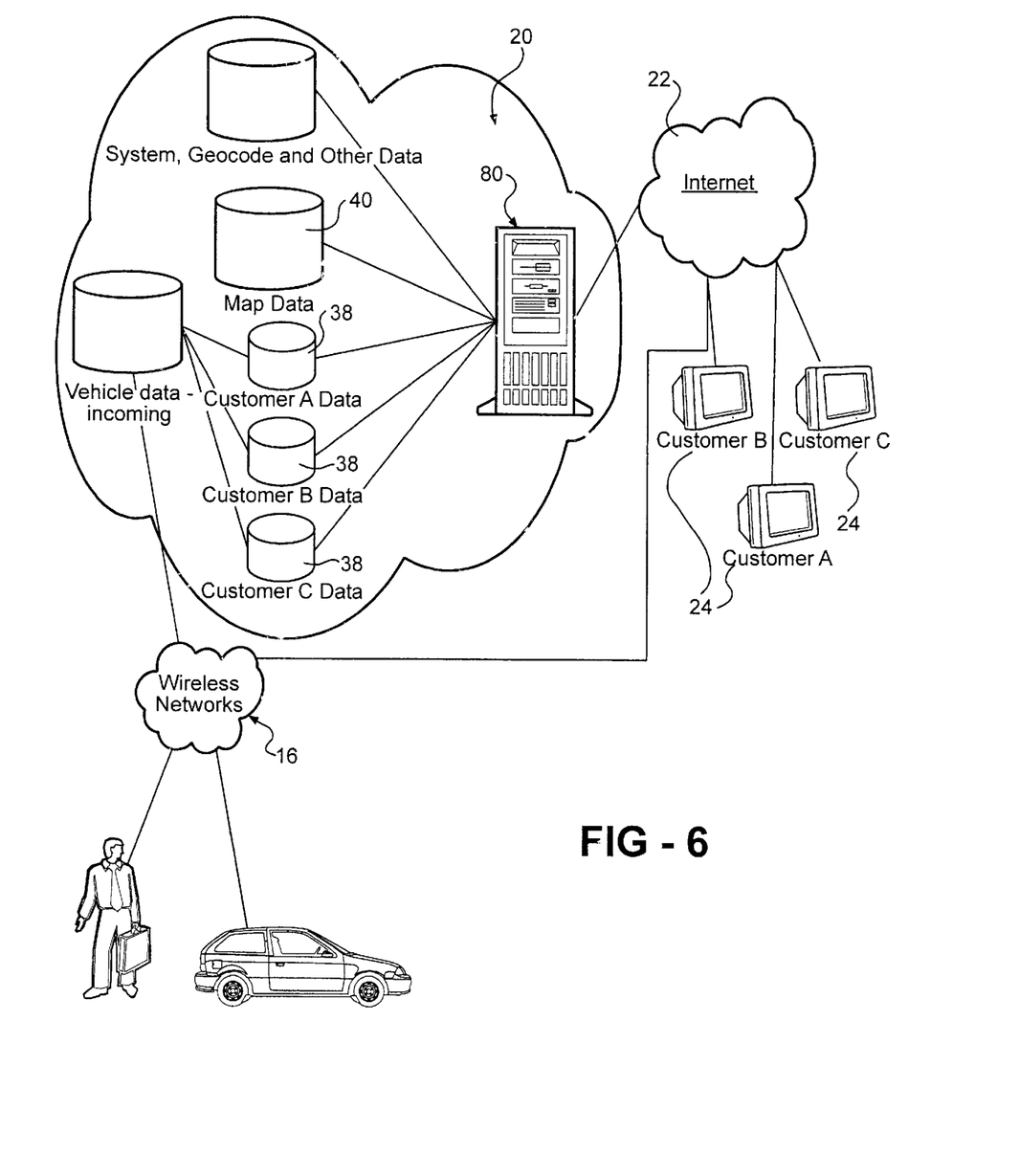
FIG. 6 is a pictorial representation of the database construction of the datacenter shown in FIG. 5.

From the wide area land network 18, the location or position data is transmitted to the datacenter 20. The datacenter 20, as shown in FIGS. 5 and 6, includes a processing station 80 which includes multiple processor based servers, such as one or more Internet servers 82 and 84, a load balancer 86, a map server 88, and a vehicle database server 90. The processing station 80 is connected to the wide area land network 18 by a router 92. A different connection and router is provided for each wireless data network interface connected to the processing station 80, such as CPCD, MSAT satellite, Mobitex and others.

Map data is obtained from various data suppliers, customers, etc., as described hereafter. Vector map data and raster map data are stored in the map server 88. The HTTP servers 82 and 84 process requests from the data communication network or Internet users 24 and generate web pages or other formatted information for transmission over the data communication network 22. Internet users 24 access the HTTP servers 82 and 84 via a connection to an Internet service provider (ISP) or dial-up through a remote access service modem 94.

The map data is stored in a separate map database controlled by the map server 88. System information, geographically referenced object information and other information is also stored in a separate database as shown in FIG. 6.

An important feature of the present invention is the provision of a separate database for each customer using the locator apparatus 10. A number of mobile objects, such as vehicles or geographically referenced objects, may be monitored or controlled by each customer. Each mobile object or vehicle has a unique ID and each customer who accesses a group of related vehicles is provided with a unique ID, with the vehicle ID for a particular customer being associated with a customer ID. This allows a specific database in the vehicle database server 90 to be maintained for all of the vehicles of one customer (customer A, customer B, or customer C as shown in FIG. 6), with all of the vehicle location data for multiple customers (i.e., customers A, B and C) being stored in the vehicle database server 90 without corruption. This also enables each customer to access only their own specific set of vehicle location data while preventing that customer from accessing the vehicle location data of another customer. This also significantly improves system performance as a customer's query to the vehicle database server 90 does not involve the vehicle location data of another customer.

In addition, the datacenter 20 stores a customer's log-in information, vehicle identification, map access, usage data for billing and onboard equipment information.

The datacenter 20 also includes communication equipment for connection to the data network 22. The data network 22 may be any data communication network, such as a wide area data network, a telephone network including wired or wireless communications, or both. However, in a preferred embodiment of the present invention, the data network 22 is the Internet. Software associated with the Internet servers 82 and 84 provides access to the data in the vehicle database server 90 based on an input request from a user to report status and other information, updates browser displays with new vehicle location data through the Internet 22 and uploads files to the user terminal equipment 24. The server software also geographically references both urban street and rural addresses and sends the address coordinates to the user's browser for display on the browser as well as processes messages between mobile and office workers.

Another important function of the datacenter 20 is to receive or generate and supply map data in pixel format for the geographic region identified in a user request.

Figure 7:
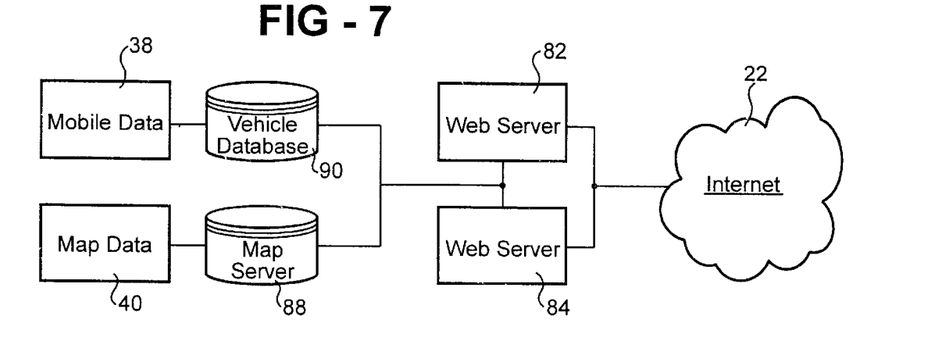
FIG. 7 is a block diagram showing the interaction of the vehicle database and map server in the datacenter shown in FIGS. 5 and 6.
Figure 8:
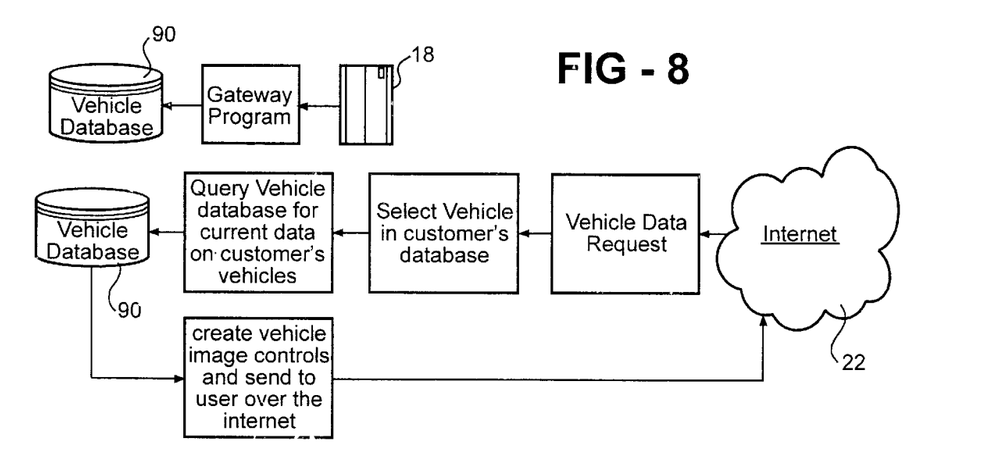
FIG. 8 is a block diagram of the data flow sequence of the datacenter in accessing vehicle position information.

As shown in FIGS. 7 and 8, all map data 40 is stored in the map database server 88. This enables the map data 40 to be stored in a separate database from the vehicle location data 38 which is stored in the vehicle database server 90.

Requests for vehicle location data 38 from the user or customer terminal equipment 24 are processed by the HTTP servers 82 or 84. The servers 82 and 84 query the vehicle location data 38 from the vehicle database server 90 and create an appropriate vehicle location information data package that is sent over the Internet 22 to the user terminal equipment 24.

Figure 9:
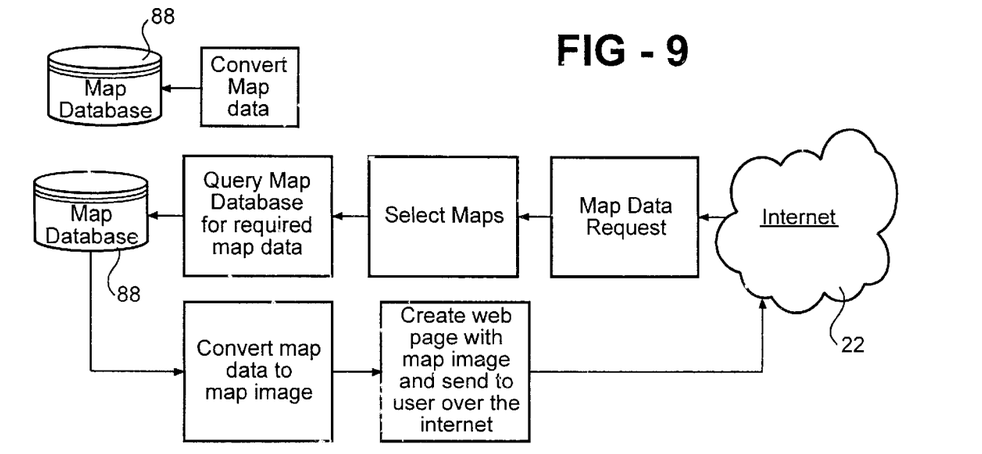
FIG. 9 is a block diagram depicting the information flow in the datacenter for a map request.

The HTTP servers 82 and 84 also process requests for map data 40. The servers 82 and 84 send a map data request to the map server 88 which processes the request. The map server 88 uses either stored vector data or stored raster map data. The map server 88 generates an image file based on the map request and sends the image file to one of the HTTP servers 82 or 84. The server 82 or 84 then generates a data package (including file name, file location, and maximum and minimum latitudes and longitudes as represented by the image file) relating to the image file and transmits the data package to the requesting user terminal equipment 24 via the data communication network or Internet 22. This sequence is shown in FIG. 9. The user terminal equipment 24 then acts on the data package by loading the image file into a predetermined position on the display of the user terminal equipment 24 and repositioning other relevant objects on the display according to the geographic boundaries of the image file.

Requests for vehicle location data 38 from user terminal equipment 24 is also processed by the processing station 80. Such vehicle data may include longitude and latitude, speed, bearing, time, and the status of digital and analog input/output signals. The data is retrieved from the vehicle database server 90 and transmitted via the data communications network or Internet 22 to the requesting user terminal equipment 24. Alternatively, the user may also request vehicle information for a past period of time instead of the current report. The vehicle location data 38 sent to the user terminal equipment 24, including vehicle display icons, is processed by browser software at the user terminal equipment 24 for display on a monitor which forms part of the user terminal equipment 24.

As described above, the map data requests are processed separately from vehicle data requests. The map data 40 is converted into an image file having the requested size and zoom level. The image file is sent to the user terminal equipment 24, with the user's browser software displaying the image file as a map. The user may request a new map without requesting new vehicle location data or the user may request new vehicle location data without requesting a new map. Maps can be supplied by any source on the data network 22 (including images, server based map software or user terminal based map software from other parties) provided the map can be displayed on the user terminal equipment 24 and the geographic coordinates of the corners of the image can be determined.

The user terminal equipment 24 may be a personal computer with keyboard, display monitor, mouse, etc. User software runs on standard Internet Explorer and Netscape browsers. This enables maps and vehicle locations to be displayed on the user terminal equipment 24 and allows a user to select specific vehicles for tracking on the map display, select maps, set the map to follow a vehicle, change the status of a vehicle, pan the map, display addresses of locations or landmarks on the map, control the vehicle location refresh rate, and display the status changes from other users, such as displaying an address location on the maps of all the user terminal equipment 24 when one user geographically references an address.

Figure 10:
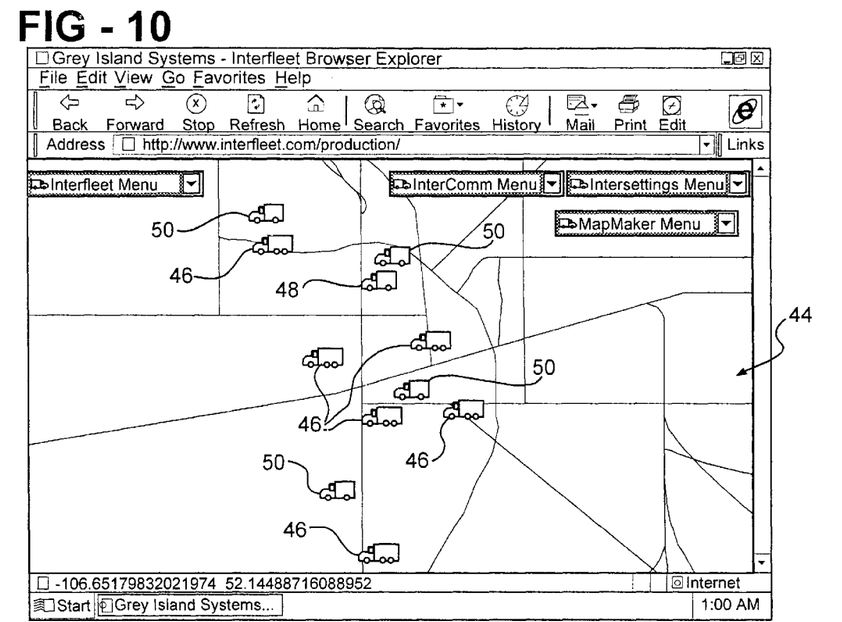
FIG. 10 is a pictorial representation of a map display with marked vehicle locations generated by the apparatus of the present invention.
Figure 15:
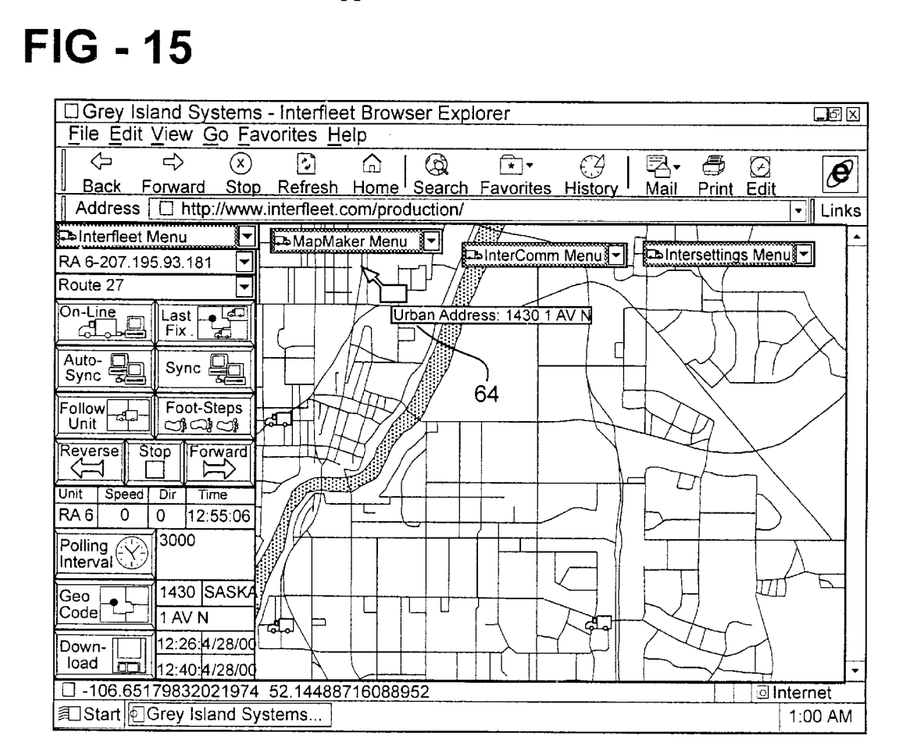
FIG. 15 is a pictorial representation illustrating the "drag and drop" feature of the present invention.

Referring now to FIGS. 10 and 15, there are depicted map displays viewable at the user terminal equipment 24 which are useful in allowing an operator, such as a dispatcher for the police, delivery company, ambulance company, etc., to track the location of vehicles under their control as well as providing two-way communication between the dispatcher and the individual mobile objects along with other features described in greater detail hereafter.

FIG. 10 depicts a static map display 44 which shows a geographic region of a selected city, state, or province, etc., as selected by the user through the user terminal equipment 24. A variety of different vehicles from different customers, such as delivery trucks 46, a police car 48, and ambulances 50, are displayed on the map display 44.

It will be understood that although the following description and illustration of the maps and vehicle positions therein are illustrated as being displayed in an overlapping relationship, the actual map data 40 and the vehicle location data 38 are stored separately in the datacenter 20 and transmitted by the datacenter 20 separately through the data network 22 to the requesting user terminal equipment 24. This enables the user of the user terminal equipment 24 to change map displays, zoom-in and out, and track a particular vehicle without requiring new or updated vehicle location data 38 from the datacenter 20.

The map 44 utilizes grid coordinates to select the map data 40 from the map database server 88 in the datacenter 20 and display the map 44 at one of the user terminal equipment 24. Normally, one user terminal equipment 24 will be able to access only one type of vehicle, such as only police cars 48, only ambulances 50, or only delivery trucks 46, etc.

The underlying map data 40 can come from any source, such as map data supplied by a map development company, such as Telus. Static maps from any source are prepared in advance using a geographic information system, such as Mapinfo and Intergraph's Microstation, scanned images or manually hand plotted drawings that are scanned to create digital images. Certain coordinate references are registered by registering certain specific pixels in a map display with true earth coordinate projections, for example, longitude and latitude. This enables the vehicle locations as generated from the GPS data received by the datacenter 20 from each mobile equipment 11 to be properly placed on a particular map display, such as the map display 44 shown in FIG. 10.

Dynamic maps can also be used and are created on-the-fly. Dynamic maps, like static maps, can also be based on aerial or satellite photographs including radar images and combinations of vector maps and image maps.

Finally, a hand drawn sketch or pictorial representation of key landmarks or cities within a particular geographic region may also be used to form a map.

The process of displaying the position of vehicles and/or other geographically referenced objects on a map requires that all object locations be converted to one geographic coordinate system. The relative distance of the minimum and maximum of the respective coordinate system for the image representing the map are calculated and converted to image pixels using 0 as the origin and the width and height of the image as the maximum values. This coordinate conversion process is applied at the user terminal equipment 24 to the coordinates of the vehicle as the vehicle coordinates are received, to place the vehicle on the screen at the specific X, Y pixel location representing the vehicle location with respect to the map image. The cost of using the user terminal equipment 24 to process the coordinate conversions and maintain the information is significantly less than the cost of purchasing datacenter equipment to perform the same function on behalf of every user. Furthermore, unlike previously devised locating systems, this coordinate conversion process allows for any image size to be used and displayed on the user terminal equipment 24.

Whenever a new map is selected, the variables used to establish the relative distances for the respective coordinate system of the map are reset along with the width and height of the map image and the positions of the objects relative to the new map. Whenever new vehicle position information is received, the new vehicle position is updated on the map display through the geographic coordinate system to pixel conversion process described above.

The maps are sent from the datacenter 20 to the requested user terminal equipment 24 when requested or automatically. Vehicle information is transmitted continuously to the user terminal equipment 24. The user terminal equipment 24 then updates the vehicle image pixel location based on the particular map display.

In the present apparatus 10, the map data 40 is stored in the map server 88 at the datacenter 20 or in the disc drive or random access memory (RAM) at the user terminal equipment 24. Since the user terminal equipment 24 can be a PC, notebook, hand held unit or any device that can connect to the Internet 22 and support a standard browser, the only requirements for the maps is that the maps be based on an earth coordinate system for correlation with the GPS vehicle location data and that geographically referenced points on the map image are known.

Figure 11:
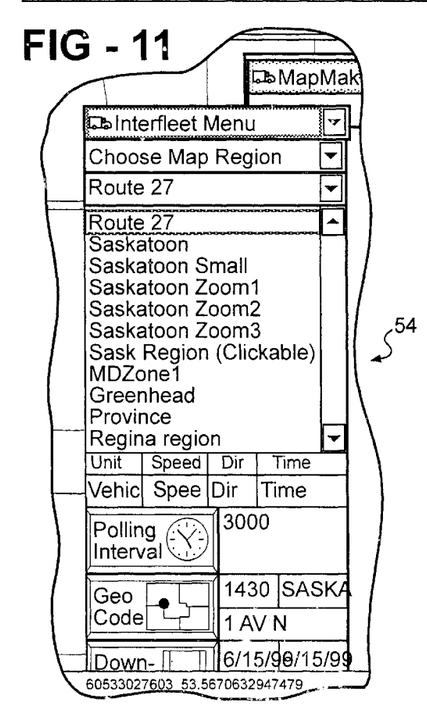
FIG. 11 is a pictorial representation of a drop down system menu generated by the apparatus of the present invention.

FIG. 11 depicts a drop down system menu 54 presented by the Internet browser which is displayed at the user terminal equipment 24 to select a map. There may be any number of maps listed in the drop down menu 54. Further, the maps can be smaller or larger than the browser display page. If larger, scroll bars will automatically be presented to enable the user to view the entire map. As shown in the drop down menu 54, the name of the map specifies one or more geographic regions embodied within the map.

As shown in FIG. 10, one toolbar selection is labeled "MapMaker Menu". The MapMaker Menu 56 is shown in detail in FIG. 12. The MapMaker Menu 56 enables a user at any one user terminal equipment 24 to request any map from the system menu 54 for display at the user terminal equipment 24. Each browser software request through the data network 22 is acted on by the datacenter 20 which selects the requested digital map records from the map server 88 and then transmits an image file representing the map data 40 through the data network 22 to the requesting user terminal equipment 24 for display.

Figure 12:
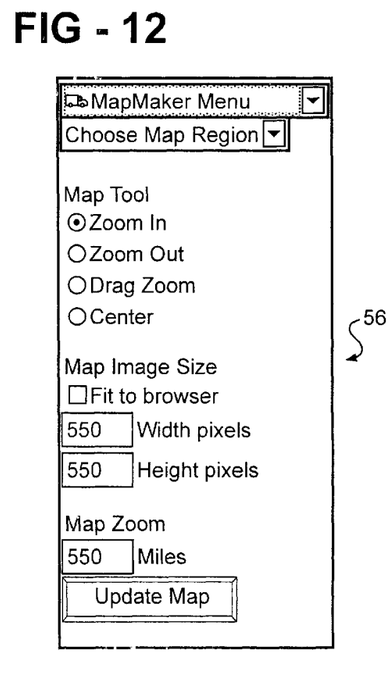
FIG. 12 is a drop down MapMaker toolbar generated by the apparatus of the present invention.

The MapMaker Menu 56 includes map tools enabling the user to "Zoom In", "Zoom Out", "Drag Zoom" and to "Center" the map over a particular vehicle. Each of these tools, when selected by a user, generates a new map request to the datacenter 20 which then takes the specified action by re-sending a smaller or larger map or a refined map centered about the particular vehicle location coordinates of a selected vehicle.

It should be noted that each map request from user terminal equipment 24 to the datacenter 20 causes the user terminal equipment 24 and the Internet service provider for the user terminal equipment 24 to cache each new map received from the datacenter 20 for a particular user. This enables all previously requested maps to be easily retrieved using "back" and "forward" operations, available in standard Internet browser software as shown in FIG. 10, without sending another map request through the data network 22 to the map server 88. As a result, the response of the present invention to a request by a user for a previously requested map is significantly quicker.

Referring back to the MapMaker Menu 56 in FIG. 12, the "Map Image Size" operation provides an automatic fit to the current browser resolution by sizing the map to fit the display of the user terminal equipment 24. In addition, the user can specify an enlargement or reduction of the map by manually setting the "Width pixels" and the "Height pixels". The "Map Zoom" operation allows the user to manually set the width of the map display in miles, such as a width of 500 to 700 miles in rural areas or a width of 50 miles within cities, for example. The "Update Map" operation refreshes the on-screen map with up-to-date zoom or size settings.

Figure 13:
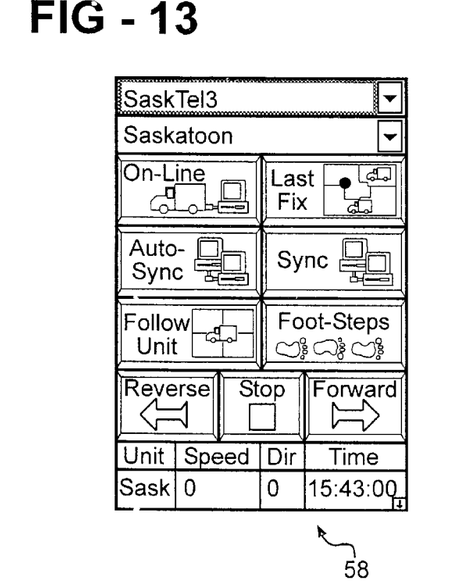
FIG. 13 is a pictorial representation of a vehicle locator interface menu generated by the apparatus of the present invention.

FIG. 13 depicts the main system interface 58 which can be displayed along with the MapMaker Menu 56 alongside of any map display. The interface 58 includes a scroll down selection menu of the vehicles which can be located for a particular customer. Likewise, a scroll down map selector is provided to enable a particular customer to visually display vehicles in several different regions via different geographic map displays customized for each customer.

The "On-Line/Off-Line" operation is used to control whether the display is on-line or off-line. The off-line mode is used primarily for playing back historical data. Normally, the system is operated in the on-line mode.

The "Last Fix" operation, when selected, searches the vehicle location database 90 via a command from the user terminal equipment 24 to the datacenter 20 to report on the last reported location of all vehicles, including vehicles that have stopped reporting (i.e. vehicles not currently displaying a vehicle location on any map). A vehicle may not report when the vehicle has traveled into an area without wireless coverage, when the vehicle is in a shelter which blocks the GPS antenna from a view of the sky, or when the apparatus 10 has not been operated for a long period of time.

The "Auto-Sync" operation allows multiple users via user terminal equipment 24 to make changes to the system, such as changing vehicle status, geographically referencing objects, etc., while allowing all other users to see the changes at the same time.

The "Sync" operation provides a one-time synchronization when selected.

The "Follow Unit" operation, when selected, causes the user terminal equipment 24 to request a new map centered on a selected vehicle, as indicated by the unit selector, from the datacenter 20, when the selected vehicle moves near an edge of the portion of the map being displayed. This enables the user terminal equipment 24 to follow the progress of the selected vehicle across an entire map.

The "Foot-Steps" operation acts in conjunction with the "Follow Unit" operation for any vehicle position displayed on a map by leaving indicators, referred to as so-called "breadcrumbs", behind the selected vehicle to track the route and progress of the selected vehicle across the map display.

Playback buttons labeled "stop", "forward" and "reverse", are used in the off-line mode for their apparent function. Finally, the status of the selected vehicle can be displayed. Status entries include the vehicle number displayed under the "Unit" label, the speed of the vehicle in kilometers per hour displayed under the "Speed" label, the direction of vehicle movement based on a 360° compass displayed under the "Dir." label and the current time displayed under the "Time" label. For example, the direction of vehicle movement is expressed in a format wherein 0° is due north, 90° is due east, 180° is due south and 270° is due west.

Figure 14:
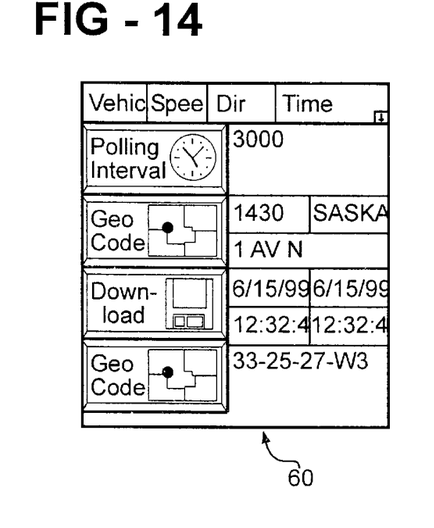
FIG. 14 is a pictorial representation of a geocode interface.

FIG. 14 depicts a geocoding pull down interface menu 60 which can be displayed on any map display. The selectable operations in the geocode menu 60 include a "Polling Interval" operation which can be changed in the off-line mode. In the on-line mode, the standard polling setting is 3 seconds. Typically, in the playback mode, a faster polling speed (i.e. a polling setting in the milliseconds) is selected to speed up the playback of the vehicle location data.

A first "Geo-Code" operation identifies the street address and city/town designation of a particular vehicle location, building, or other landmark which has been geographically referenced on a particular map.

The "Download" operation enables a user at one user terminal equipment 24 to download a 15 minute segment of data from the datacenter 20 to the vehicle location database 90. The time and date must be properly set. Finally, a second "Geo-Code" operation provides rural addressing.

Figure 16:
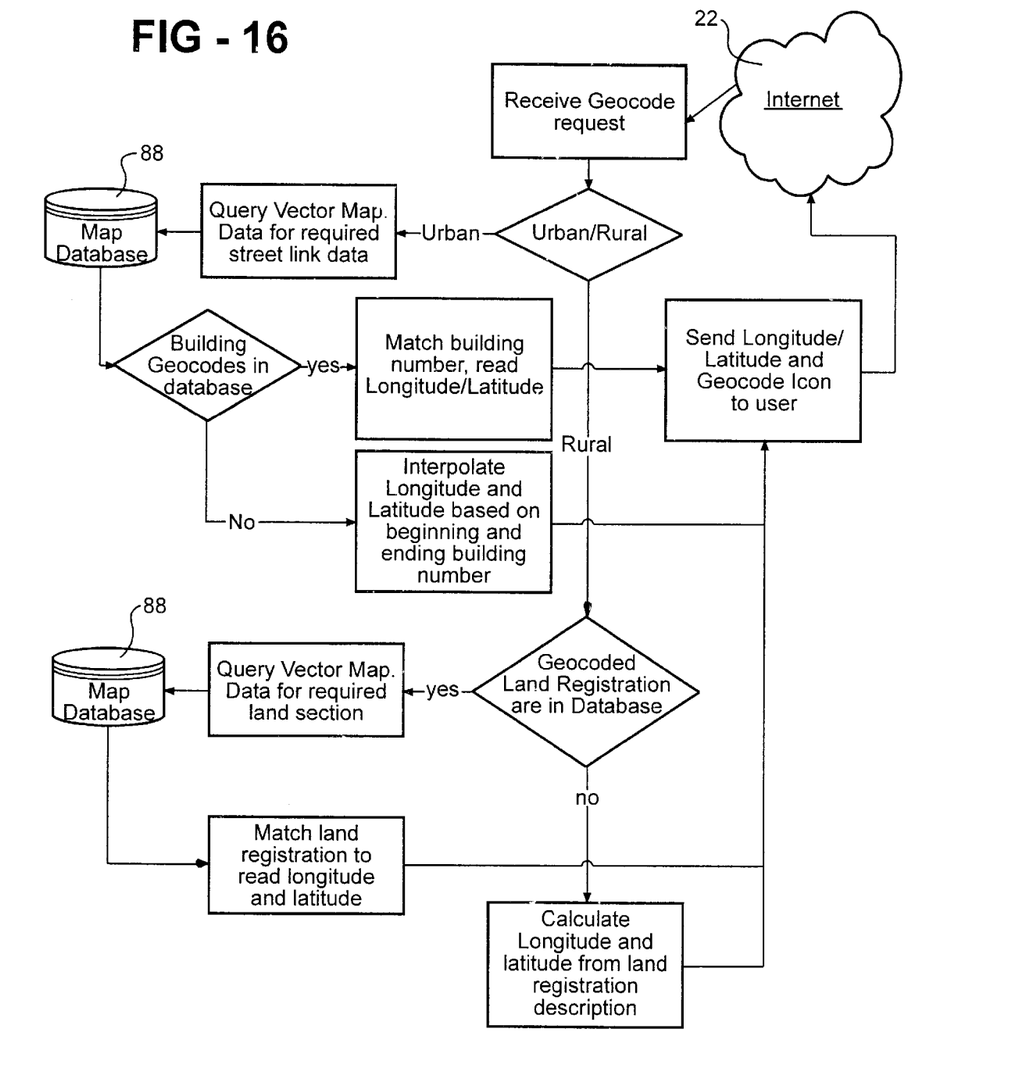
FIG. 16 is a block diagram of the geographic referencing operation according to the present invention.

The geographic referencing operation is more clearly shown in FIGS. 15 and 16. Typically, a user enters an address in the first or second "Geo-Code" box. The datacenter 20 locates and identifies the address on the map display with a location indicator 64.

The geographic referencing operation involves first determining the location of an entity, such as a street address, rural address, UTM coordinate, etc., in a geographic coordinate system using the process described above to place the entity in the correct pixel location on the map display. Urban addresses are geographically referenced on the basis of street name and building number. If the map server 88 contains the longitude and latitude of all of the buildings in a particular geographic area, then the process involves matching the street name and building number with the data in the map server 88. If only the beginning and ending building numbers for each street are stored in the map server 88, then the building location is assumed to be proportionally located along street length between the beginning and ending building numbers. That is, a building with a street address of 150 is assumed to be midway along a street having a beginning building number of the 100 and an ending building number of 200.

If the map server 88 contains longitudes and latitudes for each land section, then the rural address is geographically referenced by matching the land description in the map server 88. If the rural address is not in the map server 88, the rural land location can be calculated by known methods. That is, the longitude and latitude can be calculated from the land registration description.

When the specific latitude and longitude of a requested geographically referenced object is calculated, the information is used by the requesting user terminal equipment 24. An arrow may be provided as part of the icon to point to the specific location of the geographically referenced object.

The geographic reference may be based on user input or on the 911 ALI (automatic location identification) emergency call system. The 911 ALI emergency call system has the capability of tracking the location of each telephone placing a call to the emergency center.

Regardless of which way the geographically referenced address is determined, the datacenter 20 calculates the geographic coordinates of the address and sends the address and geographic coordinates to the requesting user terminal equipment 24. The same information can also be sent to all other user terminal equipment 24 associated with the particular customer by activating the "Auto-Sync" operation from such terminal equipment 24.

The datacenter 20 may also send the address location to the mobile computer 17, shown in FIG. 3, through the wireless data network 16 as described above. The mobile computer 17 will display the same address if the "Auto-Sync" operation is activated at the computer 17.

Figure 17:
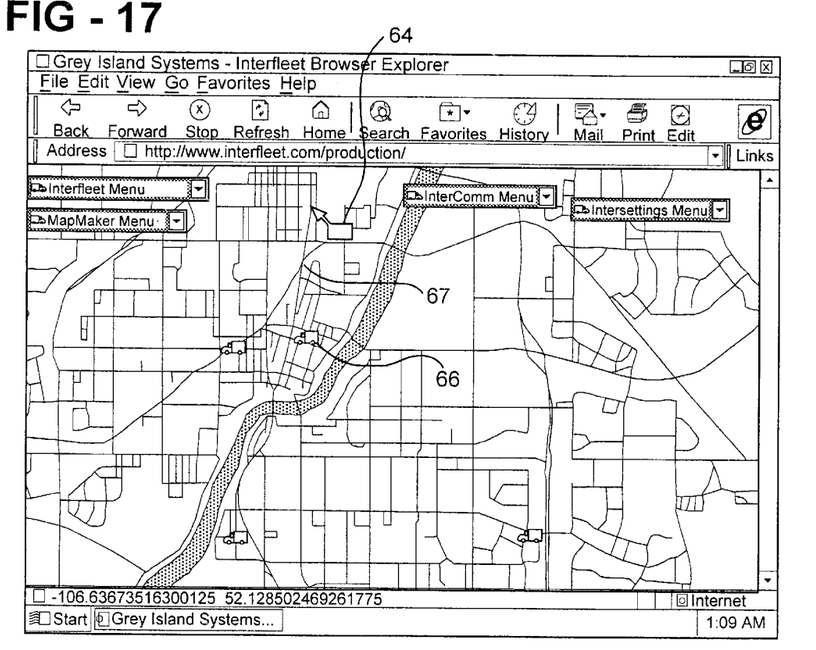
FIGS. 17 and 18 are screen displays depicting the "drag and drop" sequence of the present invention.
Figure 18:
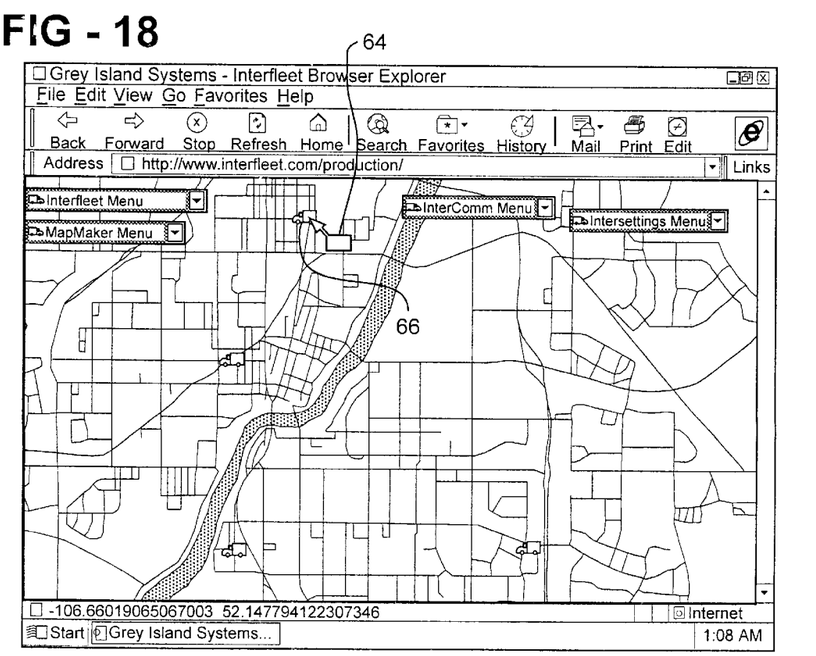

FIG. 17 depicts a "drag and drop" feature of the mobile object locator apparatus 10. As in the last example, a user enters the address of a specific location on the map into the first "Geo-Code" box in the menu shown in FIG. 15. The geographically referenced data is sent through the data network 22 to the datacenter 20 and used by the datacenter 20 to determine the specific geographic coordinates of the address. The datacenter 20 then sends the geographic coordinate information through the data network 22 to the Internet browser of the user terminal equipment 24. The browser software creates an address box 64, as shown in FIGS. 15 and 17, and positions the address box 64 with an arrow pointed to the selected geographically referenced location on the map. The user can then select a particular vehicle by using the mouse of the user terminal equipment 24 to click on an icon 66 representing the particular vehicle and drag the vehicle icon 66 to a different location on the map. The user drags the vehicle icon 66 from its present location, shown in FIG. 17, and drops the vehicle icon 66 on the geographically referenced address indicated by the address box 64, shown in FIG. 18. The browser software draws a line 67, shown in FIG. 17, between the present location of the vehicle or vehicle icon 66 and the geographically referenced address indicated by the address box 64. Addresses may be transmitted by the data network 22 through the datacenter 20 to the driver I/O interface or mobile data terminal equipment 14 in the mobile object directing the driver to drive the vehicle toward the geographically referenced address 64. The browser software relocates the vehicle icon 66 when the vehicle position information is updated from the datacenter 20 and re-draws the line 67 between the vehicle icon 66 and the geographically referenced address 64 as the vehicle 66 approaches the geographically referenced address 64.

This drag and drop feature enables a dispatcher at one user terminal equipment 24 to select any vehicle under their control and direct the selected vehicle to a geographically referenced address. The coordinate information which can be displayed by the mobile data terminal equipment 14 enables the driver to see the most direct route to the geographically referenced address.

It should be noted that the separate storage of vehicle position information for each vehicle associated with a particular end user in the vehicle database 90 enables the datacenter 20 to recall the history of movement and speed for each vehicle. This history can be accessed through the menus described above with successive vehicle positions and an indication of vehicle speed at various points along its path of movement displayed at the user terminal equipment 24 on the specific map of the geographic region through which the vehicle traveled.

What is claimed is:

1. A mobile object locator apparatus comprising:
   a datacenter;
   a plurality of receivers, one receiver mountable on one of a plurality of mobile objects, for receiving global positioning system signals from a global positioning system and calculating the position of the mobile object;
   a transmitter in communication with the receiver for transmitting the position information of the mobile object;
   a network including a wireless communication portion for receiving the position information from the transmitter and for transmitting the position information to a datacenter;
   the datacenter storing the position information in a user specific mobile object location database for all mobile objects of one user;
   map data for at least one geographic region stored in a map database;
   user terminal equipment; and
   a data network coupling the datacenter and the user terminal equipment in data communication, the user terminal equipment accessing the data network to selectively obtain the position information only from the user specific mobile object location database and the map data from the map database, the position information and the map data being transmitted separately through the data network in response to a user request.

2. The apparatus of claim 1 wherein the data network is the Internet.

3. The apparatus of claim 1 wherein the position information of the mobile object is stored by the datacenter in the user specific mobile object location database at successive time intervals.

4. The apparatus of claim 1 wherein the map data is stored in the user terminal equipment after transmission to the user terminal equipment.

5. The apparatus of claim 1 wherein the map data is stored in the map database in data communication with the datacenter and the user terminal equipment.

6. The apparatus of claim 5 wherein the user terminal equipment includes a display.

7. The apparatus of claim 6 further comprising:
   a plurality of independently selectable maps of specific geographic regions stored in the map database.

8. The apparatus of claim 6 wherein the user terminal equipment displays the map data and position information independent from each other.

9. The apparatus of claim 8 wherein the user terminal equipment provides at least one of a map zoom and map centering about a point of interest on the map display.

10. The apparatus of claim 9 wherein the user terminal equipment further comprises:
    means for following the path of movement of a selected mobile object on the map display.

11. The apparatus of claim 1 wherein the datacenter geographically references at least one location in the map data.

12. A method of automatically locating a mobile object comprising the steps of:
    mounting a receiver on each one of a plurality of mobile objects for receiving global positioning system signals from a global positioning system;
    calculating the position of the mobile object from the global positioning system signals;
    providing a wireless transmitter in data communication with the receiver for transmitting the position information of the mobile object;
    communicating the position information to a datacenter;
    storing the position information of mobile objects associated with one user in a user specific mobile object location database;
    storing map data of at least one geographic area in a map database;
    providing data communication between the datacenter and at least one remote user terminal;
    providing the user terminal with a selection of one of the map data and the position information in one user specific mobile object location database and transmitting the user terminal selection to the datacenter; and transmitting the selected one of the map data and the position information from the datacenter to the user terminal.

13. The method of claim 12 wherein the step of transmitting the selected one of the map data and the position information comprises the step of:

transmitting the map data and the position information to the user terminal independent of each other.

14. The method of claim 12 further comprising the step of:

transmitting position information to the datacenter at periodic time intervals; and storing position information for different mobile objects separately in the mobile object location database.

15. The method of claim 12 further comprising the steps of:

converting the position information to pixels corresponding to a map pixel grid; and overlaying the converted position information on displayed map data at the user terminal.

16. The method of claim 12 further comprising the step of:

at the datacenter, querying and transmitting the historical position information of a mobile object over a selected time interval.

17. A method of automatically locating a mobile object comprising the steps of:

mounting a receiver on a mobile object for receiving global positioning system signals from a global positioning system;

calculating the position of the mobile object from the global positioning system signals;

providing a wireless transmitter in data communication with the receiver for transmitting the position information of the mobile object;

communicating the position information to a datacenter;

storing the position information in a user specific mobile object location database;

storing map data of at least one geographic area in a map database;

providing data communication between the datacenter and at least one remote user terminal;

providing the user terminal with a selection of one of the map data and the position information and transmitting the user terminal selection to the datacenter;

transmitting the selected one of the map data and the position information from the datacenter to the user terminal;

geographically referencing the address of at least one location in a selected map displayed on the user terminal;

selecting one mobile object displayed on the user terminal;

dragging the selected mobile object to the location of the geographically referenced address;

returning the selected mobile object to the present mobile object position on the map; and displaying a line between the position of the selected mobile object and the location of the geographically referenced address.

18. The method of claim 17 further comprising the step of:

changing the length of the line as the selected mobile object approaches the geographically referenced address.

* * * * *